(12) United States Patent
Mannava et al.

(10) Patent No.: US 10,783,080 B2
(45) Date of Patent: Sep. 22, 2020

(54) CACHE MAINTENANCE OPERATIONS IN A DATA PROCESSING SYSTEM

(71) Applicant: Arm Limited, Cambridge (GB)

(72) Inventors: Phanindra Kumar Mannava, Austin, TX (US); Bruce James Mathewson, Papworth Everard (GB); Jamshed Jalal, Austin, TX (US); Paul Gilbert Meyer, Austin, TX (US)

(73) Assignee: ARM LIMITED, Cambridge (GB)

( * ) Notice: Subject to any disclaimer, the term of this patent is extended or adjusted under 35 U.S.C. 154(b) by 31 days.

(21) Appl. No.: 16/173,213

(22) Filed: Oct. 29, 2018

(65) Prior Publication Data

US 2020/0133865 A1 Apr. 30, 2020

(51) Int. Cl.
| | |
|---|---|
| *G06F 12/08* | (2016.01) |
| *G06F 12/0868* | (2016.01) |
| *G06F 12/0871* | (2016.01) |
| *G06F 12/1009* | (2016.01) |
| *G06F 3/06* | (2006.01) |
| *G06F 9/52* | (2006.01) |

(52) U.S. Cl.
CPC .......... *G06F 12/0868* (2013.01); *G06F 3/061* (2013.01); *G06F 3/0646* (2013.01); *G06F 3/0679* (2013.01); *G06F 9/522* (2013.01); *G06F 12/0871* (2013.01); *G06F 12/1009* (2013.01)

(58) Field of Classification Search
CPC ............ G06F 12/0868; G06F 12/0871; G06F 12/1009; G06F 3/061; G06F 3/0646; G06F 3/0679; G06F 9/522
See application file for complete search history.

(56) References Cited

U.S. PATENT DOCUMENTS

| | | | |
|---|---|---|---|
| 2015/0199290 A1* | 7/2015 | Mathewson | G06F 13/364 710/110 |
| 2016/0350021 A1* | 12/2016 | Matsushita | G06F 12/0873 |
| 2019/0239110 A1* | 8/2019 | Hegde | H04W 64/006 |

* cited by examiner

*Primary Examiner* — Kevin Verbrugge
(74) *Attorney, Agent, or Firm* — Nixon & Vanderhye PC

(57) ABSTRACT

An interconnect system and method of operating the system are disclosed. A master device has access to a cache and a slave device has an associated data storage device for long-term storage of data items. The master device can initiate a cache maintenance operation in the interconnect system with respect to a data item temporarily stored in the cache causing action to be taken by the slave device with respect to storage of the data item in the data storage device. For long latency operations the master device can issue a separated cache maintenance request specifying the data item and the slave device. In response an intermediate device signals an acknowledgment response indicating that it has taken on responsibility for completion of the cache maintenance operation and issues the separated cache maintenance request to the slave device. The slave device signals the acknowledgement response to the intermediate device and on completion of the cache maintenance operation with respect to the data item stored in the data storage device signals a completion response to the master device.

20 Claims, 8 Drawing Sheets

CACHE MAINTENANCE OPERATIONS IN A DATA PROCESSING SYSTEM

TECHNICAL FIELD

The present disclosure relates to data processing. In particular, the present disclosure relates to cache maintenance operations in a data processing system.

DESCRIPTION

A data processing system may comprise a master device which performs data processing operations with respect to data items and a slave device which is associated with a long-term storage device for those data items. The master device may have access to a cache to temporarily store copies of data items retrieved from the long term storage to mitigate against the time required to access those data items in the long term storage. When the data processing operations carried out by the master device cause modification of a data item held in the cache, ultimately that modification will need to be made to the copy of the data item in the long term storage.

SUMMARY

In one example embodiment described herein there is an interconnect system comprising: a master device; a cache for temporary storage of data items for low-latency access by the master device; an intermediate device; a slave device, wherein the slave device has an associated data storage device for long-term storage of the data items; and interconnect circuitry connecting the master device, the intermediate device, and the slave device, wherein the master device is capable of initiating a cache maintenance operation in the interconnect system with respect to a data item temporarily stored in the cache, wherein the cache maintenance operation comprises action taken by the slave device with respect to storage of the data item in the data storage device, wherein, when the cache maintenance operation is predetermined as a long-latency operation the master device is capable of issuing to the intermediate device a separated cache maintenance request specifying the data item and the slave device; the intermediate device is responsive to the separated cache maintenance request to signal an acknowledgment response to the master device indicative that the intermediate device has taken on responsibility for completion of the cache maintenance operation with respect to the data item and to issue the separated cache maintenance request to the slave device; and the slave device is responsive to receipt of the separated cache maintenance request to signal the acknowledgement response to the intermediate device and is responsive to completion of the cache maintenance operation with respect to the data item stored in the data storage device to signal a completion response to the master device.

In one example embodiment described herein there is a method of operating an interconnect system comprising a master device, a cache for temporary storage of data items for low-latency access by the master device, an intermediate device, a slave device, wherein the slave device has an associated data storage device for long-term storage of the data items, and interconnect circuitry connecting the master device, the intermediate device, and the slave device, the method comprising: initiating from the master device a cache maintenance operation in the interconnect system with respect to a data item temporarily stored in the cache, wherein the cache maintenance operation comprises action taken by the slave device with respect to storage of the data item in the data storage device, wherein, when the cache maintenance operation is predetermined as a long-latency operation, the initiating comprises issuing from the master device to the intermediate device a separated cache maintenance request specifying the data item and the slave device, and the method further comprises the steps of: signalling an acknowledgment response to the master device from the intermediate device in response to the separated cache maintenance request indicative that the intermediate device has taken on responsibility for completion of the cache maintenance operation with respect to the data item; issuing the separated cache maintenance request to the slave device; signalling the acknowledgement response to the intermediate device from the slave device in response to receipt of the separated cache maintenance request; and signalling a completion response to the master device from the slave device in response to completion of the cache maintenance operation with respect to the data item stored in the data storage device.

In one example embodiment described herein there is an interconnect system comprising: master device means; caching means for temporary storage of data items for low-latency access by the master device means; intermediate device means; slave device means, wherein the slave device means has associated data storage means for long-term storage of the data items; interconnect means for connecting the master device means, the intermediate device means, and the slave device means; means for initiating from the master device means a cache maintenance operation in the interconnect system with respect to a data item temporarily stored in the caching means, wherein the cache maintenance operation comprises action taken by the slave device means with respect to storage of the data item in the data storage means, wherein, when the cache maintenance operation is predetermined as a long-latency operation, the means for initiating comprises means for issuing from the master device to the intermediate device means a separated cache maintenance request specifying the data item and the slave device means, and the interconnect system further comprises: means for signalling an acknowledgment response to the master device means from the intermediate device means in response to the separated cache maintenance request indicative that the intermediate device means has taken on responsibility for completion of the cache maintenance operation with respect to the data item; means for issuing the separated cache maintenance request to the slave device means; means for signalling the acknowledgement response to the intermediate device means from the slave device means in response to receipt of the separated cache maintenance request; and means for signalling a completion response to the master device means from the slave device means in response to completion of the cache maintenance operation with respect to the data item stored in the data storage means.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
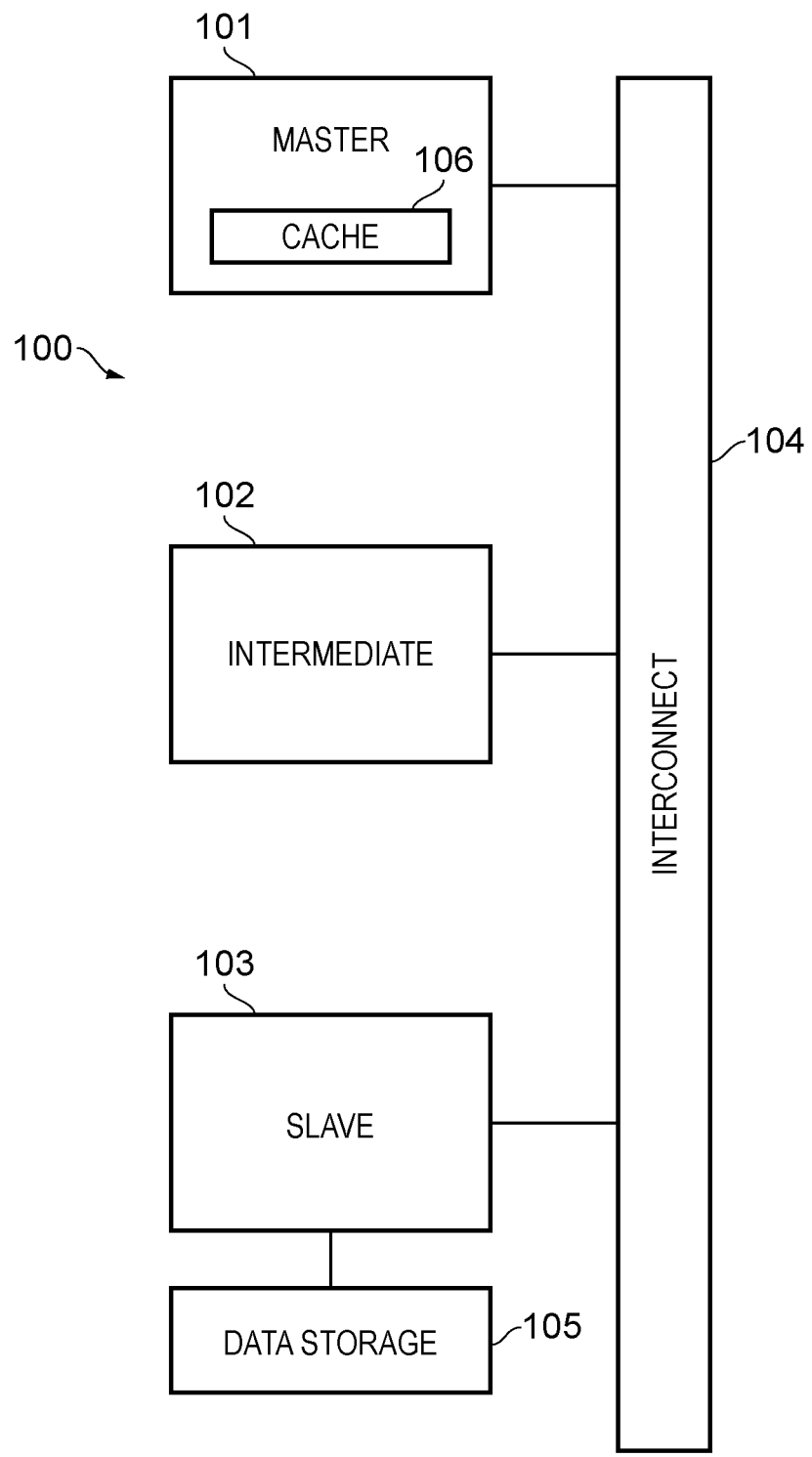
FIG. 1 schematically illustrates an interconnect system in one example embodiment.

Before discussing the embodiments with reference to the accompanying figures, the following description of embodiments is provided.

In accordance with one example configuration there is provided an interconnect system comprising: a master device; a cache for temporary storage of data items for low-latency access by the master device; an intermediate device; a slave device, wherein the slave device has an associated data storage device for long-term storage of the data items; and interconnect circuitry connecting the master device, the intermediate device, and the slave device, wherein the master device is capable of initiating a cache maintenance operation in the interconnect system with respect to a data item temporarily stored in the cache, wherein the cache maintenance operation comprises action taken by the slave device with respect to storage of the data item in the data storage device, wherein, when the cache maintenance operation is predetermined as a long-latency operation the master device is capable of issuing to the intermediate device a separated cache maintenance request specifying the data item and the slave device; the intermediate device is responsive to the separated cache maintenance request to signal an acknowledgement response to the master device indicative that the intermediate device has taken on responsibility for completion of the cache maintenance operation with respect to the data item and to issue the separated cache maintenance request to the slave device; and the slave device is responsive to receipt of the separated cache maintenance request to signal the acknowledgement response to the intermediate device and is responsive to completion of the cache maintenance operation with respect to the data item stored in the data storage device to signal a completion response to the master device.

The master device in the interconnect system has access to a cache for temporary storage of data items and there may be a variety of circumstances under which it is desirable that a cache maintenance operation is carried out within the interconnect system with respect to a given data item stored in the cache. In particular, where the interconnect system comprises a slave device associated with a long-term storage for data items, from which data items used by the master device and temporarily stored in the cache were originally retrieved, the present techniques are concerned with cache maintenance operations which comprise action taken by the slave device with respect to one or more data items in the data storage device. However, the present techniques further recognise that not only may there be a significant latency associated with accessing the data storage device associated with the slave device, but indeed that the completion of a cache maintenance operation with respect to a data item temporarily stored in the cache, where the cache maintenance operation comprises action taken by the slave device with respect to a data item in the data storage device, may also incur significant latency. In this context, although it is useful for the master device to be able to initiate a cache maintenance operation in the interconnect system with respect to a data item stored in the cache, it may then become a burden for the master device to remain associated with that cache maintenance operation until its completion, due to the latency associated with that operation. Thus the present techniques propose that for cache maintenance operations which are categorized as "long latency" the master device can initiate a cache maintenance operation in the interconnect system by issuing a separated cache maintenance request to an intermediate device in the interconnect system. In response, the intermediate device takes on responsibility for completion of the cache maintenance operation with respect to the data item and itself issues the separate cache maintenance request (i.e. the same type of transaction) to the slave device. The master device receives an acknowledgement from the intermediate device that this responsibility has been taken on. This then releases the master device from that responsibility and it is only on completion of a cache maintenance operation that the slave device (under the instruction of the intermediate device) signals completion of the cache maintenance operation to the master device. This separation of the cache maintenance operation means that the administrative burden on the master device is reduced, allowing its resources to be focused elsewhere.

The data storage device for long-term storage data items may take a variety of forms and the cache maintenance operation may also take a variety of forms, but in some embodiments the data storage device for long-term storage of the data items comprises non-volatile storage and the cache maintenance operation is a persistent cache maintenance operation to cause the data item to be written to the non-volatile storage and the persistent cache maintenance operation is predetermined as a long-latency operation. The present techniques may find particular applicability in such a context, for a number of reasons. Firstly, when the data storage device comprises non-volatile storage, it may be desirable for the master device to be able to cause a cache maintenance operation to be performed which causes a data item in the cache to be written to the non-volatile storage. In particular, it may be advantageous for the master device to be able to initiate such an operation and to know when it is completed, because at this point the master device knows that the data has then been safely stored and will not be lost (e.g. on occurrence of a power failure). Thus according to such embodiments the master device can cause such persistent cache maintenance operations to be carried out, and yet not be burdened by their full administration until completion, where this responsibility is taken on by the intermediate device in the interconnect system.

In some embodiments the master device comprises a request buffer to store request details of issued requests, wherein the master device is responsive to receipt of the acknowledgment response from the intermediate device to cease storage of request details of the separated cache maintenance request. Accordingly the request buffer represents one feature of the master device for which the administrative burden may be reduced by the application of the present techniques, in that the master device need only maintain the storage of request details of the separated cache maintenance request until the acknowledgement response has been received from the intermediate device. At this point the master device can already cease storage of those request details. It should be noted that in this sense "ceasing storage" does not necessarily mean any kind of explicit deletion, but rather this may merely comprise marking a certain set of request details in a storage component as invalid, such that they may be subsequently (when the storage space is required) be overwritten.

The master device may nevertheless further comprise a mechanism for a simplified degree of tracking with respect to cache maintenance requests and accordingly in some embodiments the master device comprises a request counter, wherein the request counter is responsive to issuance to the intermediate device of the separated cache maintenance request to increment and wherein the request counter is responsive to receipt of the completion response from the slave device to decrement. This therefore provides a mechanism by which the master device, with the commitment of only a modest amount of storage, can keep track of status of the cache maintenance requests which it has issued.

In some embodiments the master device is capable of issuing the separated cache maintenance request comprising a group identifier, the intermediate device is capable of signalling the acknowledgment response to the master device further comprising the group identifier, and the slave device is capable of signalling the acknowledgment response comprising the group identifier and of signalling the completion response comprising the group identifier. The further configuration of the separate cache maintenance request to comprise a group identifier and the associated signalling of this group identifier with both the acknowledgement response and the completion response enables the master device to associate certain cache maintenance operations with certain aspects of the data processing operations which it carries out which may find a variety of applications.

Furthermore, in some embodiments the master device is capable of specifying the group identifier from a set of group identifiers and the master device comprises a set of request counters corresponding to the set of group identifiers, wherein each request counter of the set of request counters is responsive to issuance to the intermediate device of the separated cache maintenance request specifying a corresponding group identifier from the set of group identifiers to increment and wherein the each request counter of the set of request counters is responsive to receipt of the completion response from the slave device specifying the corresponding group identifier to decrement. Accordingly, by the provision of a request counter corresponding to a group identifier, the master device can then keep track of the status of separated cache maintenance requests corresponding to each identified group.

This approach of grouping cache maintenance operations together in this manner may find a variety of applications, but in some embodiments the master device is capable of associating the group identifier with a staged data processing operation comprising at least one first stage operation and at least one second stage operation, and wherein the master device is capable of issuing the separated cache maintenance request comprising the group identifier in association with the at least one first stage operation, and the master device is capable of withholding initiation of the at least one second stage operation until receipt of the completion response comprising the group identifier from the slave device. Accordingly, the master device can ensure that cache maintenance operations which must be computed before the second stage operation can start have indeed been completed.

This administration of the completion of cache maintenance requests in the context of a staged data processing operation may also make use of at least one of the above mentioned request counters and accordingly in some embodiments the master device comprises a request counter having an initial value, wherein the request counter is responsive to issuance to the intermediate device of the separated cache maintenance request comprising the group identifier to increment and wherein the request counter is responsive to receipt of the completion response comprising the group identifier from the slave device to decrement, and the master device is capable of withholding initiation of the at least one second stage operation until the request counter returns to the initial value. The progression from the first stage operation to the second stage operation can thus be made dependent on the value of the request counter.

The stage processing operation may take a variety of forms, but in some embodiments the staged data processing operation comprises at least one of: a privilege level transition; a translation table update; execution of a barrier instruction; and execution of a specified set of instructions. In such example contexts the master device can therefore for example ensure that cache maintenance operations associated with a first privilege level are complete before the transition to a second privilege level takes place. Similarly the master can ensure that cache maintenance operations associated with a state of the master device having a particular translation table configuration (e.g. a virtual to physical address translation table configuration) are complete before a state change (e.g. to allow a new virtual machine to begin operation) occurs. The master device can also ensure that a barrier instruction has its desired effect in the wider interconnect system, by associating certain cache maintenance operations with the barrier instruction. Indeed any set of instructions may be associated with a cache maintenance operation such that it is ensured that the cache maintenance operation is complete before other instructions are then executed. For example in some embodiments the master device is arranged to execute sets of instructions corresponding to distinct physical or virtual threads and the specified set of instructions is associated with a specified thread.

The slave device may signal the completion response to the master device in a variety of ways, but in some embodiments the slave device is responsive to completion of the cache maintenance operation with respect to the data item stored in the data storage device to signal the completion response to the master device via the intermediate device. Thus it will be appreciated that the slave device may signal the completion response to the master device directly or may signal the completion device to the master device via the intermediate device.

There may in some embodiments be further caches in the interconnect system, for example belonging to other master devices, and steps may be taken to ensure cache coherency between these multiple caches. Accordingly, in some embodiments the intermediate device is capable of performing cache coherency operations with respect to the data items, and wherein the intermediate device is responsive to the separated cache maintenance request to perform a cache coherency operation with respect to the data item specified in the separated cache maintenance request before signalling the acknowledgment response to the master device and before issuing the separated cache maintenance request to the slave device. The intermediate device can therefore ensure that the requirements of the cache coherency protocol being implemented in the interconnect system are respected when administering the separated cache maintenance request.

In some embodiments the master device is capable of issuing the separated cache maintenance request comprising an identifier for the data item, an identifier for the slave device, an identifier for the master device and the group identifier, wherein the slave device is responsive to receipt of the separated cache maintenance request to initiate the cache maintenance operation with respect to the data item stored in the data storage device, to store the identifier for the master device and the group identifier, and to discard the identifier for the data item and the identifier for the slave device, and the completion response generated by the slave device comprises the identifier for the master device and the group identifier. This reduces the storage burden on the slave device since in signalling the completion response to the master device, which requires the master device to be identified (for routing) and the group identifier (for the master device to correctly process the completion response), other information need not be held by the slave device whilst the cache maintenance operation with respect to the data item stored in the data storage device is actually being carried out.

The cache may be provided at a variety of locations in the system, for example local to the master, local to the intermediate device (which may be part of the interconnect), local to the interconnect, or closer to memory. Accordingly in some embodiments the cache is a local cache associated with the master device. In some embodiments the cache is associated with the intermediate device. In some embodiments the cache is associated with the interconnect circuitry.

Although generally the slave device responds to receipt of the separated cache maintenance request by first signalling the acknowledgement response to the intermediate device and then later, on completion of the cache maintenance operation, signalling the completion response to the master device, the acknowledgement response and completion response may also be combined. For example, the slave device, on receipt of the separated cache maintenance request, may opportunistically combine the acknowledgement response and completion response as one message sent to the intermediate device. The intermediate device is then responsible for forwarding the completion response to the master device on behalf of the slave device. Accordingly in some embodiments the slave device is responsive to receipt of the separated cache maintenance request to evaluate a response condition in dependence on the cache maintenance operation and the slave device is responsive to evaluation of the response condition as true to combine the acknowledgement response and the completion response as a combined response signalled to the intermediate device. The response condition may be variously defined depending on the system requirements, i.e. under what conditions the slave device should combine the acknowledgement response and the completion response, but is some embodiments the slave device is arranged to evaluate the response condition to be true when an estimated completion latency of the cache maintenance operation is below a latency threshold. Thus the slave device can be arranged to judge the latency of a given cache maintenance operation and when that latency is acceptably low the slave device can then respond to separated cache maintenance request with a combined separated cache maintenance request once the cache maintenance operation is complete.

In some embodiments the interconnect system further comprises volatile storage associated with the slave device and the persistent cache maintenance operation is arranged to cause the data item to copied from the volatile storage to the non-volatile storage.

In accordance with example configuration there is provided a method of operating an interconnect system comprising a master device, a cache for temporary storage of data items for low-latency access by the master device, an intermediate device, a slave device, wherein the slave device has an associated data storage device for long-term storage of the data items, and interconnect circuitry connecting the master device, the intermediate device, and the slave device, the method comprising: initiating from the master device a cache maintenance operation in the interconnect system with respect to a data item temporarily stored in the cache, wherein the cache maintenance operation comprises action taken by the slave device with respect to storage of the data item in the data storage device, wherein, when the cache maintenance operation is predetermined as a long-latency operation, the initiating comprises issuing from the master device to the intermediate device a separated cache maintenance request specifying the data item and the slave device, and the method further comprises the steps of: signalling an acknowledgment response to the master device from the intermediate device in response to the separated cache maintenance request indicative that the intermediate device has taken on responsibility for completion of the cache maintenance operation with respect to the data item; issuing the separated cache maintenance request to the slave device; signalling the acknowledgement response to the intermediate device from the slave device in response to receipt of the separated cache maintenance request; and signalling a completion response to the master device from the slave device in response to completion of the cache maintenance operation with respect to the data item stored in the data storage device.

In accordance with one example configuration there is provided an interconnect system comprising: master device means; caching means for temporary storage of data items for low-latency access by the master device means; intermediate device means; slave device means, wherein the slave device means has associated data storage means for long-term storage of the data items; interconnect means for connecting the master device means, the intermediate device means, and the slave device means; means for initiating from the master device means a cache maintenance operation in the interconnect system with respect to a data item temporarily stored in the caching means, wherein the cache maintenance operation comprises action taken by the slave device means with respect to storage of the data item in the data storage means, wherein, when the cache maintenance operation is predetermined as a long-latency operation, the means for initiating comprises means for issuing from the master device to the intermediate device means a separated cache maintenance request specifying the data item and the slave device means, and the interconnect system further comprises: means for signalling an acknowledgment response to the master device means from the intermediate device means in response to the separated cache maintenance request indicative that the intermediate device means has taken on responsibility for completion of the cache maintenance operation with respect to the data item; means for issuing the separated cache maintenance request to the slave device means; means for signalling the acknowledgement response to the intermediate device means from the slave device means in response to receipt of the separated cache maintenance request; and means for signalling a completion response to the master device means from the slave device means in response to completion of the cache maintenance operation with respect to the data item stored in the data storage means.

Particular embodiments will now be described with reference to the figures.

FIG. 1 schematically illustrates a data processing system 100 in one example embodiment. The system comprises a master device 101, an intermediate device 102, and a slave device 103, these being connected together by means of an interconnect 104. FIG. 1 further illustrates that the master device 101 comprises a local cache 106 and the slave device 103 is connected to a data storage device 105. Accordingly, in performing its data processing operations, the master device 101 accesses data items stored in the data storage 105 (through interaction with the slave device 103) and causes copies of these to be stored in its local cache 106. Once the master device 101 has completed its data processing operations with respect to a copy of a given data item cached in the local cache 106, when the local copy has been modified with respect to the original copy, it is necessary for this update to be written back to the data storage 105. Further, the master device 101 can initiate cache maintenance operations with respect to data items stored in its local cache 106, which require interaction through the interconnect 104 with other components of the data processing system 100 and in particular with the data storage 105.

Figure 2:
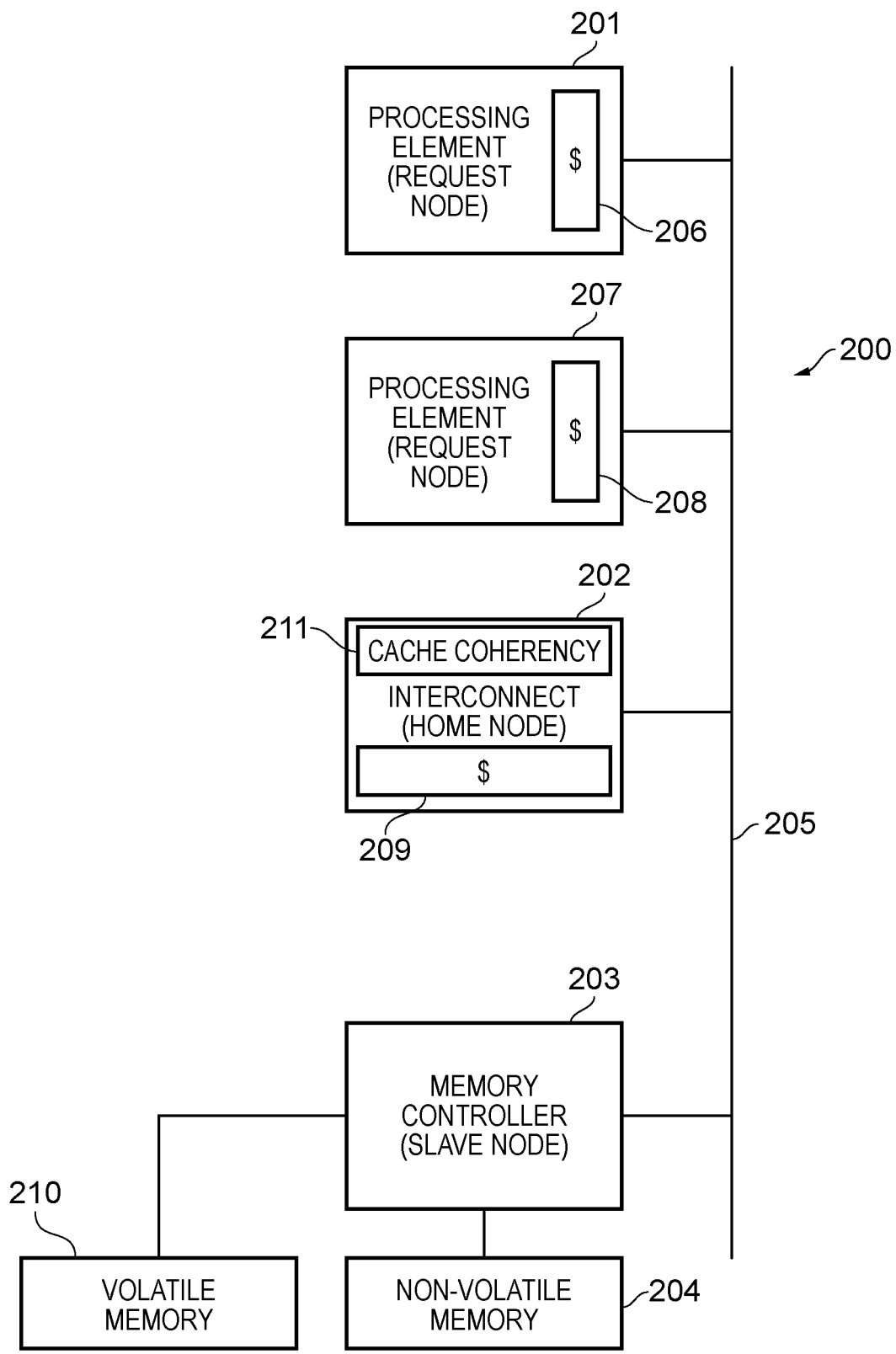
FIG. 2 schematically illustrates an interconnect system in one example embodiment.

FIG. 2 schematically illustrates a data processing system 200 in one example embodiment. The data processing system 200 can be seen to comprise a processing elements 201 and 207, an interconnect 202, a memory controller 203, a volatile memory 210 and a non-volatile memory 204. The processing element 201, the interconnect 202 and the memory controller 203 are shown in FIG. 2 as being connected together by means of a shared path 205. One of ordinary skill in the art will recognise that an "interconnect" provided in a data processing system to connect together various components of the data processing system may in itself comprise considerable autonomy and for this reason in FIG. 2 is represented as a "node" within the system, in the manner that the processing element 201 is also labelled as being a "request node", and the memory controller is also labelled as being a "slave node". Moreover, as shown there is also a cache 209 associated with the interconnect 209. The interconnect 202 which may in fact be considered to further comprise the shared path 205, is further labelled as being a "home node". The interconnect therefore represents an intermediate device in the system via which the request node 201 and the slave node 203 may interact. FIG. 2 also illustrates that the processing element 201 comprises a local cache 206 and processing element 207 comprises a local cache 208. In operation, when performing its data processing operations, the processing element 201 issues transactions via the interconnect 202/shared path 205, to the memory controller 203 in order to cause certain data items to be retrieved from the volatile memory 210 and/or the non-volatile memory 204 and to be temporarily stored in its local data cache 206. In parallel to this the processing element 207 issues transactions via the interconnect 202/shared path 205, to the memory controller 203 in order to cause certain data items to be retrieved from the volatile memory 210 and/or the non-volatile memory 204 and to be temporarily stored in its local data cache 208. In order to ensure that coherency of the copied data items is maintained, the interconnect administers a defined cache coherency protocol (by means of cache coherency circuitry 211) and carries out cache coherency operations as required. Further, the processing element 201 and processing element 207 can each initiate cache maintenance operations with respect to data items stored in one of the caches in the system, which it does so by issuing transactions via the interconnect 202/shared path 205. For example, the processing element 201 can issue a cache maintenance operation which will cause a data item temporarily stored in its local cache 206 to be used as part of a cache maintenance operation which pushes a modified copy of a data item stored in the cache 206 out to the non-volatile memory 204. Another cache maintenance operation can cause a data item temporarily stored in interconnect cache 209 to be used as part of a cache maintenance operation, pushing a modified copy of a data item stored in the cache 209 out to the non-volatile memory 204. Another cache maintenance operation can cause a data item stored in the volatile memory 210 to be moved to the non-volatile memory 204. Such operations are also referred to herein as a "persistent cache maintenance operation" and being able to perform such a persistent cache maintenance operation is of benefit to the processing elements 201 and 207, since once it knows that the operation has completed, the associated data is then "safe" in the sense that it will not be lost even in the event of an immediate power failure. As will be described in more detail with respect to the figures which follow, the processing elements 201 and 207 of FIG. 2 (or indeed the master device 101 of FIG. 1) can cause cache maintenance operations to be carried out by the issuance of certain transactions via the interconnect.

Figure 3A:
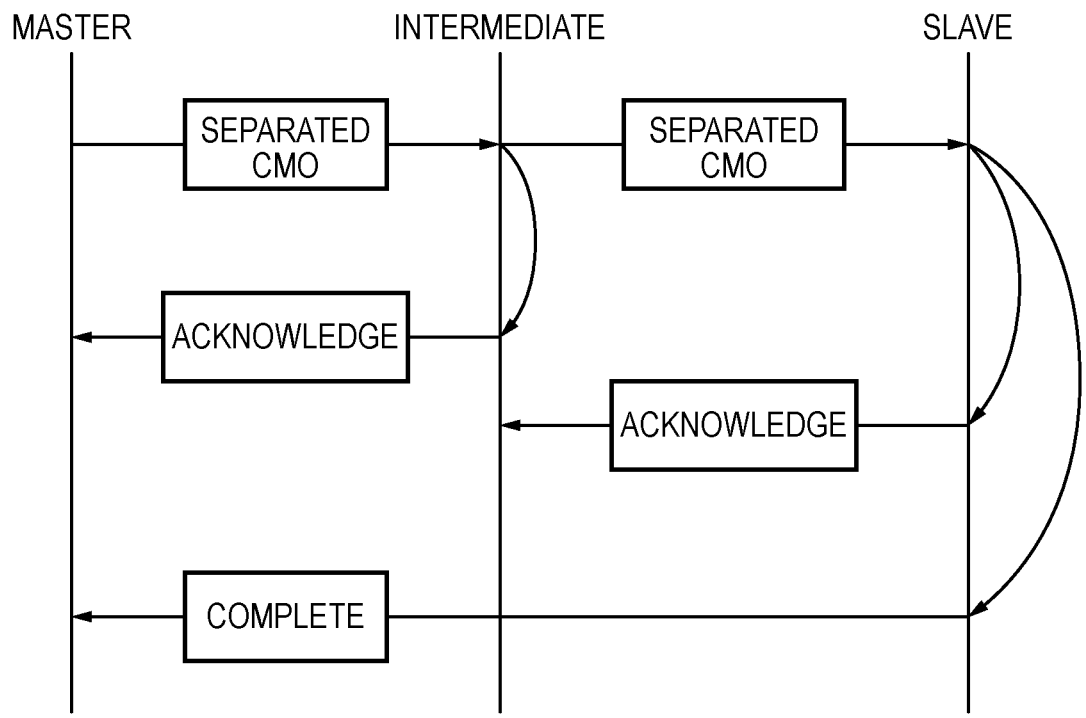
FIGS. 3A, 3B, and 3C are signalling diagrams showing transactions exchanged between a master, an intermediate, and a slave, in one example embodiment.
Figure 3B:
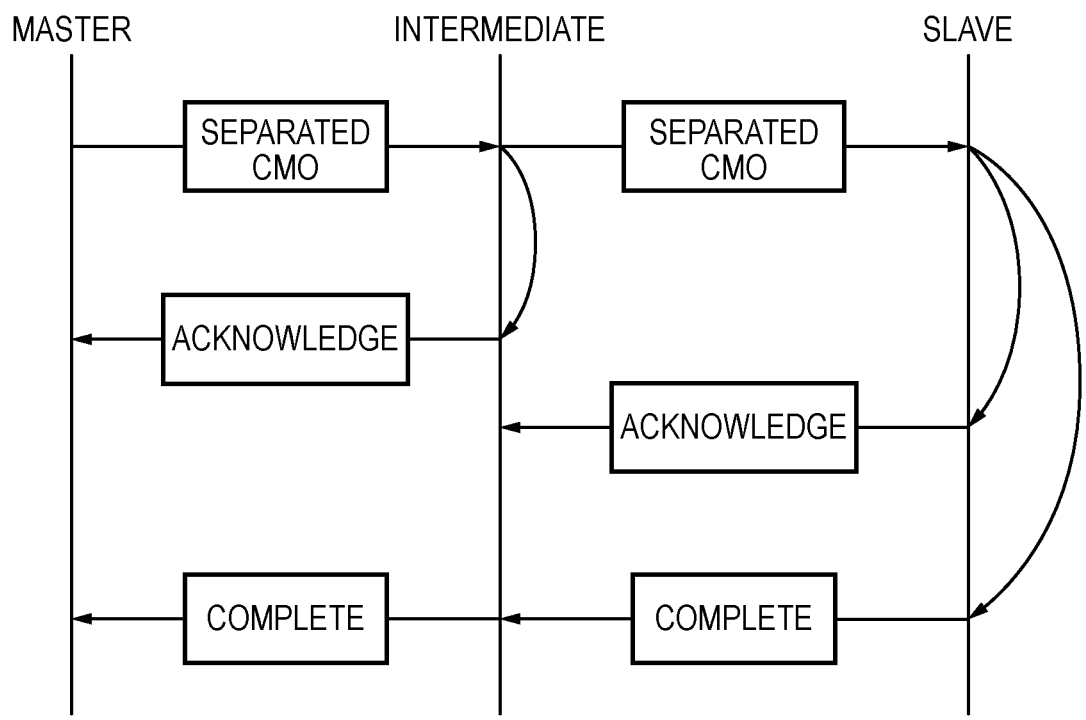
Figure 3C:
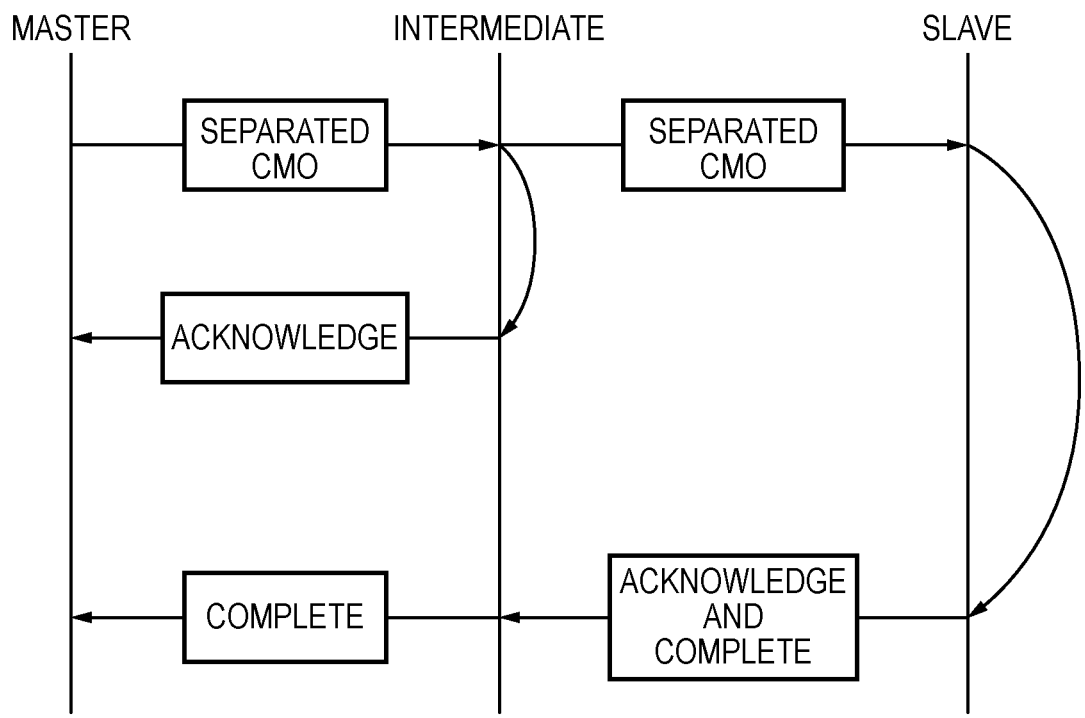

FIG. 3A shows the exchange of certain transactions between the components within a data processing system in one example embodiment. The process shown in FIG. 3A begins when a master device in the system (such as the master 101 in FIG. 1 or the processing element 201 in FIG. 2) issues a separated cache maintenance operation (CMO) transaction to an intermediate device in the system. With reference to FIG. 2 it should therefore be recognised that the interconnect itself may represent the intermediate device. In response the intermediate device itself issues its own separated CMO transaction to a slave device in the system and also issues an acknowledge transaction to the master device. The intermediate device has then taken on the responsibility for completion of the cache maintenance operation with respect to a data storage device associated with the slave device in the system and on receipt of the acknowledge transaction the master device need only await a final indication that the cache maintenance operation has been completed. In response to reception of the separated CMO transaction from the intermediate device, the slave device issues an acknowledge transaction to the intermediate device and, once it has fully carried out the cache maintenance operation, the slave device issues a complete transaction to the master device. On receipt of this complete transaction the master device knows that the cache maintenance operation it initiated has now been fully completed. FIG. 3B shows a variant on the sequence of transactions shown in FIG. 3A, indicating that the complete response transaction issued by the slave device need not be directed to the master device but rather can initially be a transaction between the slave device and intermediate device and in response the intermediate device can then send (essentially the same) complete transaction to the master device. Thus it will be understood that the master device may receive notification of the completion of the cache maintenance operation either directly from the slave device or via the intermediate device. FIG. 3C shows a further variant on the sequence of transactions shown in FIGS. 3A and 3B, indicating that the slave device can combine the acknowledge transaction and the complete transaction into a combined "acknowledge and complete" transaction. It should be appreciated that is not the "standard" behaviour in response to receipt of the separated CMO transaction, according to which the slave device will generally promptly respond with the acknowledge transaction and then later respond with the complete transaction when the long-latency cache maintenance operation is complete. Nevertheless in the example of FIG. 3C the slave device can opportunistically assess the operation required and may, under certain conditions, combine the acknowledge transaction and the complete transaction into a combined "acknowledge and complete" transaction as shown. For example, the slave device may do this when an estimated completion latency of the cache maintenance operation is below a defined latency threshold. In other words, although a separated CMO transaction was issued (suggesting that the issuer expected that the required cache maintenance operation would be "long latency"), the slave device can assess this for itself, for example with reference to information about how long certain operations are expected to take to complete, and when the slave determines that the operation is expected to complete within the defined latency threshold it can combine the acknowledge transaction and the complete transaction into a combined "acknowledge and complete" transaction as shown. Although the intermediate device may then receive the acknowledge (part of the combined "acknowledge and complete" transaction) later than it would have received a separate acknowledge transaction, only one transaction (instead of two) is issued by the slave device in response to the separated CMO transaction, thus reducing the number of messages passed through the interconnect and (at least in this regard) increasing interconnect efficiency.

Figure 4:
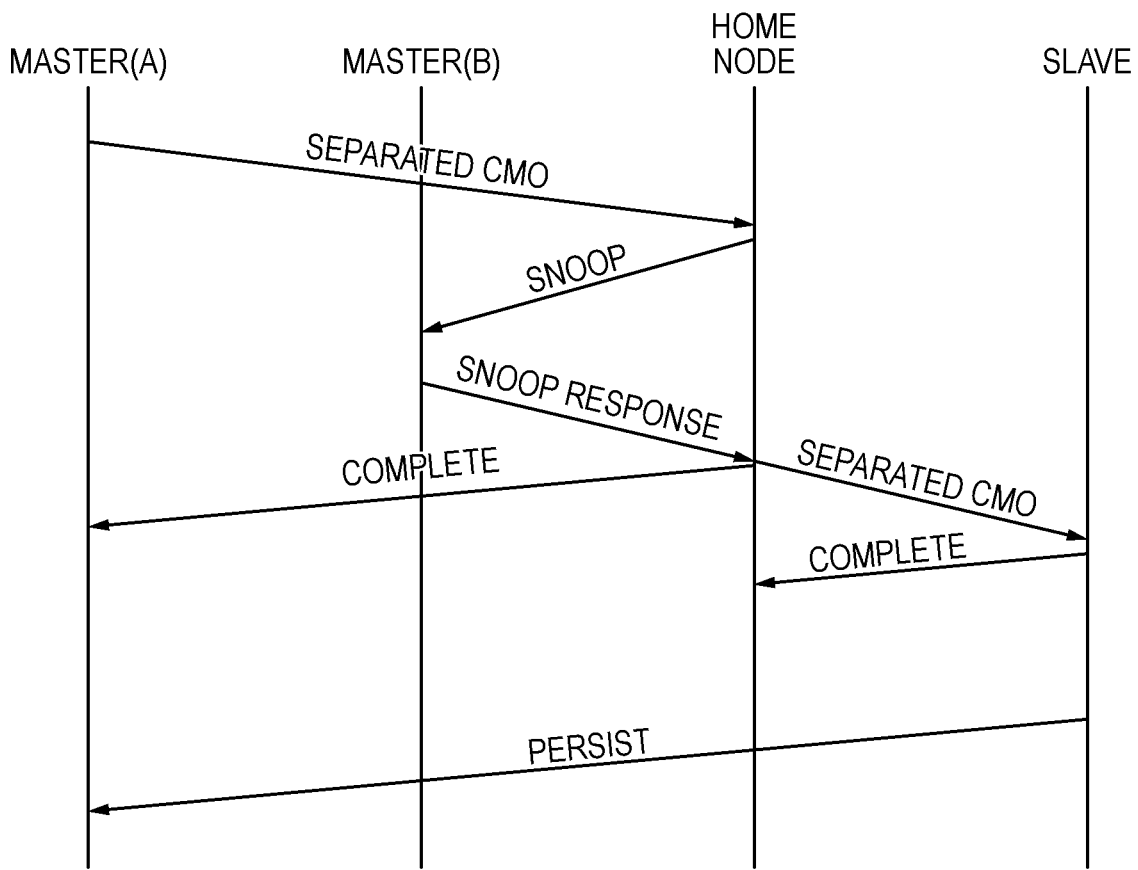
FIG. 4 is a signalling diagram showing transactions exchanged between a first master, a second master, a home node, and a slave in one example embodiment.

FIG. 4 show some example transactions exchanged between components of a data processing system in one example embodiment. Here the distinction made to the illustrations of FIG. 3A and FIG. 3B is that two master devices, Master (A) and Master (B) are shown, indicating that the data processing system comprises (at least) two master devices. Significantly, each of these master devices comprises a local cache for temporary storage of data items. Accordingly, the data processing system implements a cache coherency protocol which is administered by a home node of the system (in this example embodiment by the interconnect circuitry) in order to ensure that correct coherency between temporary copies made of data items in the system is maintained. In this context FIG. 4 illustrates that when a first separated CMO transaction is transmitted from master (A) to the home node, the home node first causes a snoop to be carried out with respect to the local cache of the master (B) in the system and the master (B) responds with a snoop response. For the purposes of the illustration of FIG. 4, this snoop response may take a variety of forms, for example indicating that the relevant data item is not present in the local cache of master (B) or may involve further steps being carried out in order to first ensure that the coherency protocol is respected, before master (B) indicates that the home node can continue with the requested cache maintenance operation with respect to the specified data item. Whatever the specific nature of the cache coherency steps which are carried out, once the home node receives an indication that it may proceed with the cache coherency operation requested by the separate CMO, it issues a complete transaction to the master (A) and issues its own separated CMO transaction to the slave device. In response the slave device issues a complete transaction to the home node and then proceeds to carry out the required operation with respect to the specified data item(s) in the data storage associated with the slave, which in this example is a non-volatile memory such as that illustrated in FIG. 2. Once the operation is complete, for example to cause a modified version of the data item to be written back to the non-volatile memory, the slave issues a "persist" transaction to the master (A) indicating that the data item has now been made persistent in the non-volatile memory.

Figure 5A:
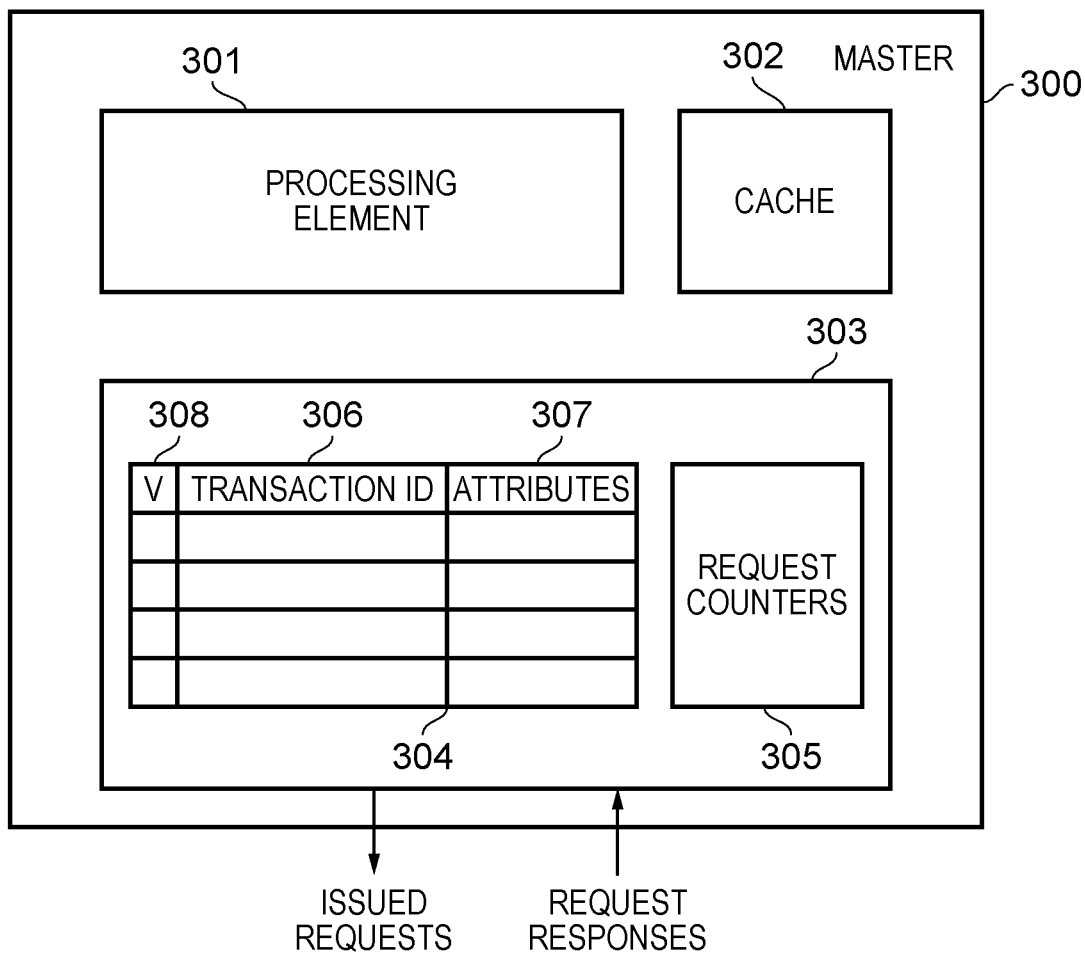
FIG. 5A schematically illustrates some components of a master device in one example embodiment.

FIG. 5A schematically illustrates in more detail the configuration of a master device 300 in one example embodiment. The master device 300 comprises a processing element 301, which performs data operations, supported by the provision of a local cache 302, which stores copies of data items retrieved from memory. The master device 300 further comprises transaction circuitry 303, which is shown to comprise a transaction table 304 and a set of request counters 305. The transaction circuitry 303 causes issued requests (transactions) to be passed out to the interconnect and receives request responses (transactions) from the interconnect. For the purpose of administering these issued requests and the corresponding request responses the transaction circuitry 303 makes use of the transaction table 304 in which entries indicate a transaction ID 306 and other attributes 307 relevant to the transaction. Accordingly, when the processing element 301 needs to cause a cache maintenance operation to be carried out with respect to a data item stored in cache 302, the transaction circuitry 303 causes a corresponding transaction to be issued to the interconnect. A record of the transaction (identified by its transaction ID 306) is stored in an entry of the transaction table 304, along with any required further attributes 307. In addition a request counter is incremented indicating that a request (for a cache maintenance operation) has been issued and is pending. A set of request counters is provided in the example of FIG. 5, where each is associated with a group ID and a selected group ID can associated by the master device 300 with the transactions it issues. As described above with respect to the preceding figures, when the processing element 301 causes a separated cache maintenance operation (CMO) to be issued, the master device 300 can expect two transactions to be returned in response. The first of these comes from the intermediate device to which the separated CMO is issued and the second comes from the slave device controlling the data storage device. In response to the acknowledgement response received from the intermediate device the transaction circuitry 303 of the master device 300 then knows that the intermediate device has taken on responsibility for completion of the cache maintenance operation and the corresponding entry in the transaction table 304 need no longer be maintained. In the example of FIG. 5A the transaction circuitry 303 does this by means of a validity bit 308 stored in association with each entry in the transaction table 304, marking an entry invalid on receipt of the acknowledge transaction from the intermediate device, meaning that this entry can be overwritten as required by the ongoing processing of transactions by the transaction circuitry 303. The master 300 nevertheless retains the information that a cache maintenance operation is still pending in the system by virtue of the incremented request counter amongst the request counters 306. It should be noted that although the example of FIG. 5A shows a set of request counters 305, there may be examples in which only a single request counter is required to support the operation of the transaction circuitry 303. Once the transaction circuitry 303 of the master device 300 receives the complete transaction from the slave device it decrements the request counter and the processing element 301 then knows that the requested cache maintenance operation, e.g. a persistent cache maintenance operation to cause a copy of a data item in the cache 302 to be written back to non-volatile memory, has been carried out. The use of a set of group IDs, one of which may be associated with a transaction, and the corresponding set of request counters, enables the master device to track completion of groups of transactions. In an alternative the request counters 305 may be substituted by a set of bit vectors performing an equivalent function, where a bit vector may for example be associated with each group ID, and setting and unsetting of bits in the bit vector can thus used to track completion of groups of transactions.

Figure 5B:
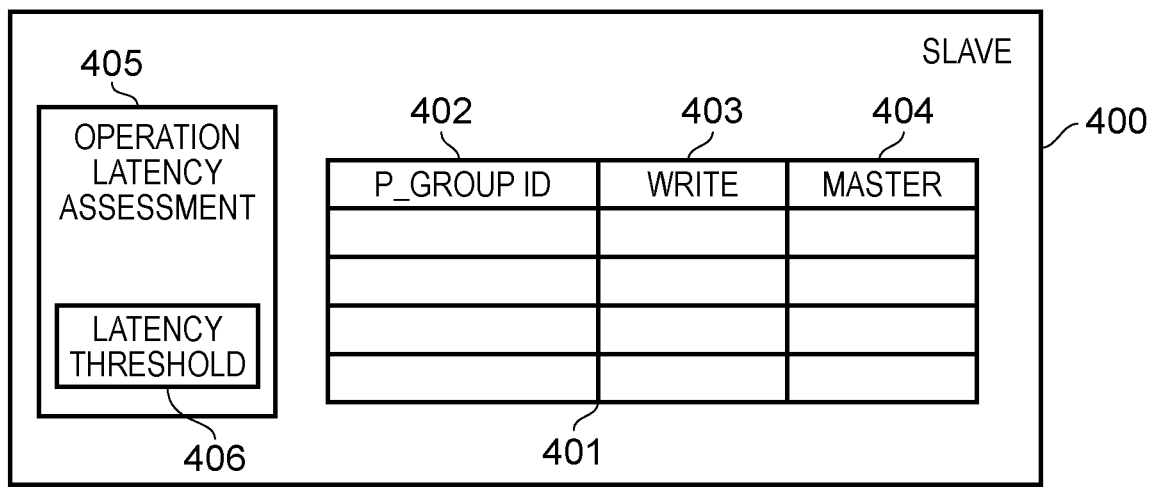
FIG. 5B schematically illustrates some components of a slave device in one example embodiment.

FIG. 5B schematically illustrates a slave device 400 in one example embodiment. The slave device 400 is shown to comprise a transaction table 401 in which entries are made which indicate a group ID 402 and an indication of a write to be performed 403 with respect to the data storage device associated with the slave device 400. On receipt of a separated cache maintenance operation transaction the slave device 400 creates an entry in the table 401, keeping track of the write itself 403 and its associated group ID 402. The table 401 further comprises an indication 404 of the master device which originated this separated cache maintenance operation. This is transferred from the intermediate device to the slave device as part of the separated cache maintenance operation transaction. Hence, on completion of the operation with respect to the data storage device, the slave device 400 can construct a transaction to send to the master device on the basis of the corresponding entry in the transaction table 401. In this example, where the associated master device comprises multiple request counters, the transaction comprises a group ID indicating which of these request counters should be decremented on receipt of this complete transaction.

The group ID can be made use of in various ways by the master device 300 when issuing separated CMO transactions. One usage is in association with a staged data processing operation, i.e. an operation which has at least a distinct first part and a second part, where the first part precedes the second part. Moreover where the master device needs various cache maintenance operations to be carried out in association with the first part, it can make use of a selected group ID to label and group together those cache maintenance operations associated with the first part. The above-described techniques for tracking the completion of separated CMOs with a given group ID thus provide the master with the facility to track the completion of the separated CMOs associated with the first part of the staged data processing operation. It can then, if appropriate, not begin the second part of staged data processing operation until it knows that all separated CMOs with the selected group ID have completed. For example when a privilege level transition is intended in the master device, but a number of CMOs must be complete (e.g. cached data used in the prior privilege level is made persistent in non-volatile memory) before the transition can occur, this allows the master to ensure that those CMOs are complete before it makes the privilege level transition. Similarly when a translation table is to be updated (for example an address translation table belonging to one virtual machine is to be changed to hold content for another virtual machine) the clear protection between the two can be supported by the use of a group ID labelling separated CMOs. The use of barrier instructions or other groupings of instructions may also be supported by the use of a group ID labelling separated CMOs to ensure that certain cache maintenance operations are complete before instruction execution proceeds. The master device may be arranged to execute sets of instructions corresponding to distinct physical or virtual threads and the specified set of instructions can then be associated with a specified thread.

FIG. 5B also shows that the slave device 400 comprises operation latency assessment circuitry 405 and storage for a latency threshold 406. On receipt of a separated CMO transaction the operation latency assessment circuitry 405 can determine the expected latency for the required operation (for example with reference to stored information about how long certain operations are expected to take to complete). When this expected latency is below a defined threshold (stored in the latency threshold storage 406), the slave device combines the acknowledge transaction and the complete transaction into a combined "acknowledge and complete" transaction as described above with reference to FIG. 3C.

Figure 6:
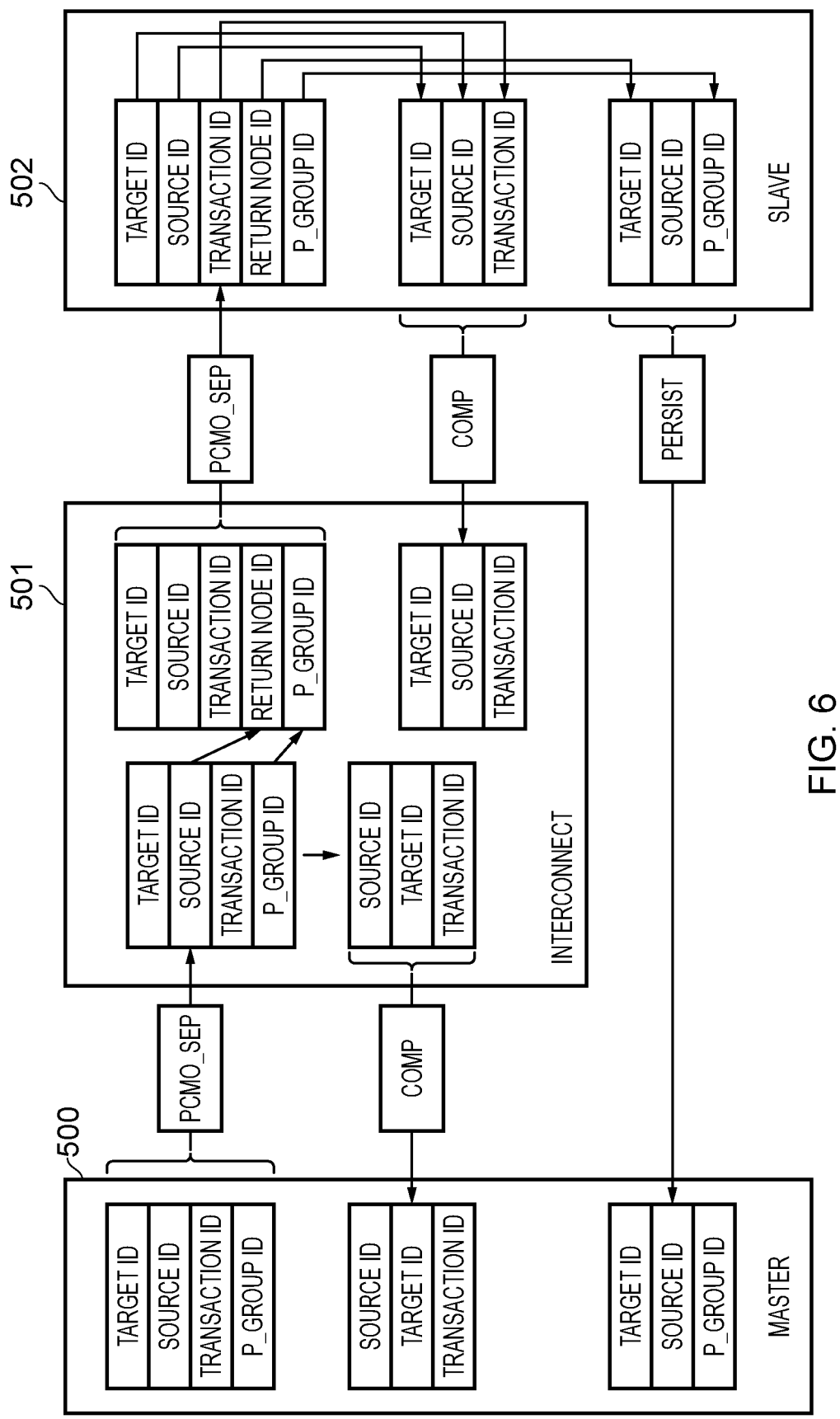
FIG. 6 schematically illustrates an interconnect system and the make up of various transactions which are exchanged within the system in one example embodiment.

FIG. 6 schematically illustrates a master 500, an interconnect 501, and a slave 502 in one example embodiment. In particular FIG. 6 shows certain items of information which are used to form transactions between the master 500, the interconnect 501, and the slave 502. In this example embodiment the slave 502 controls access to a non-volatile memory device. The master device 500 can thus cause a persistent cache maintenance operation to be carried out by the issuance of the transaction PCMO_SEP. This transaction conveys information relating to the source (the master 500, a transaction ID and a group ID). On receipt of this PCMO_SEP transaction the interconnect 501 uses the source ID information to determine a return node ID (i.e. the identity of the master to which the slave must ultimately indicate that the operation has completed) and transfers the group ID unamended. The interconnect 501 on receipt of the PCMO_SEP transaction from the master 500 also constructs a "complete" response, indicating that it has taken on responsibility for completion of the cache maintenance operation wherein the source ID of the PCMO_SEP transaction provides the target ID of the "complete" transaction, the identity of the interconnect 501 (also provided by the target ID of the PCMO_SEP transaction) provides the source ID, and the interconnect provides it own transaction ID. This complete transaction is received by the master 500.

The interconnect 501 then constructs its own PCMO_SEP transaction which is issued to the slave device 502 with its own transaction ID, indicating the interconnect 501 as the source. On receipt of this transaction the slave 502 constructs a complete transaction which is returned to the interconnect device 501 and the source ID of the PCMO_SEP transaction is used as the target identifier, the slave device's own identifier (which is also the target ID of the PCMO_SEP transaction) provides the source ID, and the slave device returns the transaction identifier provided by the interconnect 501. This complete transaction is then received by the interconnect 501.

On completion of the requested cache maintenance operation (e.g. writing back a data item or set of data items to a non-volatile memory) the slave device 502 constructs a "persist" transaction to be sent to the master device 500. The return node ID of the received PCMO_SEP transaction provides the target ID for the persist transaction, the identity of the slave provides the source identifier, and the group identifier received as part of the PCMO_SEP transaction is returned as part of the persist transaction. This persist transaction is received by the master 500. Note that the slave does not include a transaction identifier in the "persist" response, because the master only needs to associate the response with a persistent group and does not need to know the exact original transaction that it is in response to.

Figure 7:
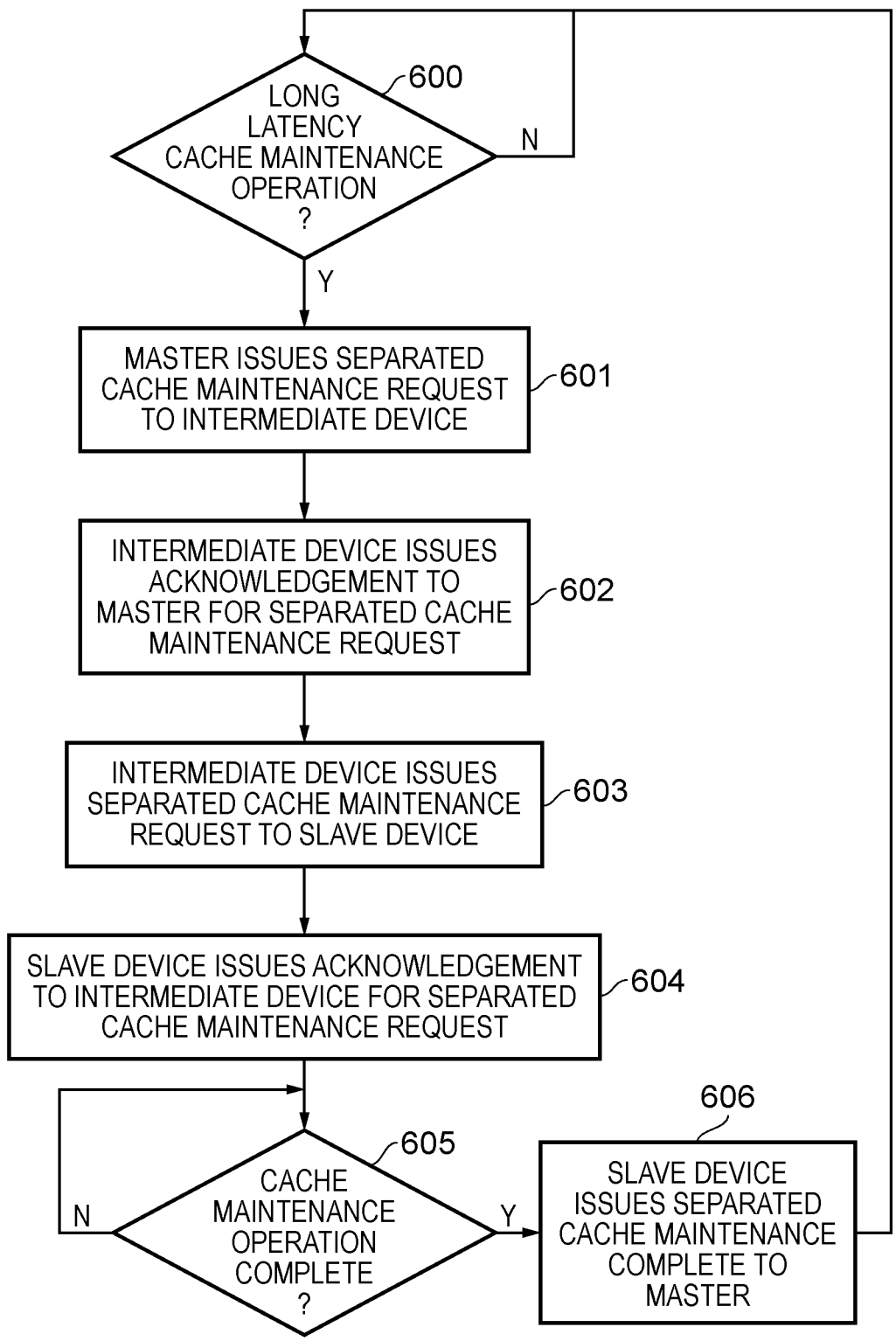
FIG. 7 is a flow diagram showing a sequence of steps which are taken according to the method of one example embodiment.

FIG. 7 shows a sequence of steps which are carried out within an interconnect system in one example embodiment. The flow can be considered to begin at step 600 where it is determined if a long latency cache maintenance operation is required. The flow waits at this step until this is true. When such a cache maintenance operation is required then at step 601 a master device issues a separated cache maintenance request to an intermediate device in the system specifying this required cache maintenance operation. Then at step 602 the intermediate device issues an acknowledgement to the master for the separated cache maintenance request and further at step 603 the intermediate device issues its own separated cache maintenance request to a slave device in the system. At step 604 the slave device issues an acknowledgement to the intermediate device for the separated cache maintenance request and initiates the required operation. At step 605 it is determined if the cache maintenance operation is complete and whilst it is not the flow waits at this step. Once the cache maintenance operation is determined to be complete at step 605 then the flow proceeds to step 606 where the slave device issues a separated cache maintenance complete signal to the master device from which the original request originated. The flow then returns to step 600.

Figure 8:
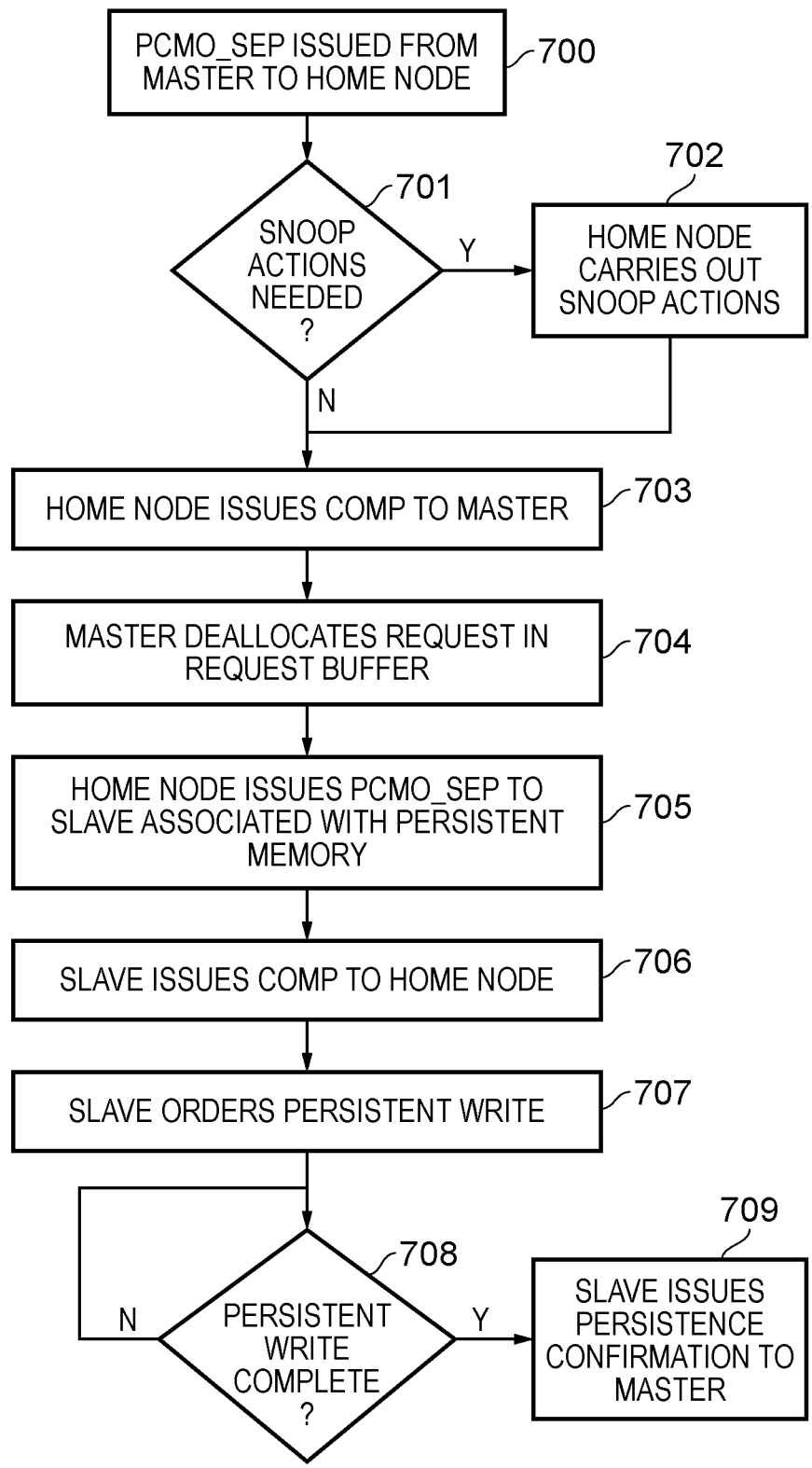
FIG. 8 is a flow diagram showing a sequence of steps which are taken according to the method of one example embodiment.

FIG. 8 shows a sequence of steps which are taken according to the method of one example embodiment. The flow begins at step 700 where a master node in the system issues a PCMO_SEP transaction to a home node in the system. Then at step 701 the home node determines if any snoop actions are required with respect to the data item(s) specified in the transaction. If they are, then the flow proceeds via step 702 where the home node carries out such snoop actions before continuing with the remaining steps. Then at step 703 the home node issues a "comp" transaction to the master node indicating that the responsibility for completion of the cache maintenance operation has been taken on by the home node. Then having received this, at step 704 the master deallocates the corresponding request in its request buffer, i.e. this storage space can then be used to store details of a subsequent request which it issues. At step 705 the home node issues its own PCMO_SEP transaction to a slave node in the system which is associated with persistent (non-volatile) memory. In response, at step 706 the slave issues a comp transaction to the home node. The slave node orders a persistent write at step 707 in order to cause the data item(s) specified by the PCMO_SEP transaction which is received to be written to the non-volatile memory and the flow then waits at step 708 until the slave receives an indication that this persistent write is complete. Once it is then at step 709 the slave node issues a persistent confirmation transaction to the master node.

In brief overall summary an interconnect system and method of operating the system are disclosed. A master device has access to a cache and a slave device has an associated data storage device for long-term storage of data items. The master device can initiate a cache maintenance operation in the interconnect system with respect to a data item temporarily stored in the cache causing action to be taken by the slave device with respect to storage of the data item in the data storage device. For long latency operations the master device can issue a separated cache maintenance request specifying the data item and the slave device. In response an intermediate device signals an acknowledgment response indicating that it has taken on responsibility for completion of the cache maintenance operation and issues the separated cache maintenance request to the slave device. The slave device signals the acknowledgement response to the intermediate device and on completion of the cache maintenance operation with respect to the data item stored in the data storage device signals a completion response to the master device.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. An interconnect system comprising:
   a master device;
   a cache for temporary storage of data items for low-latency access by the master device;
   an intermediate device;
   a slave device, wherein the slave device has an associated data storage device for long-term storage of the data items; and
   interconnect circuitry connecting the master device, the intermediate device, and the slave device,
   wherein the master device is capable of initiating a cache maintenance operation in the interconnect system with respect to a data item temporarily stored in the cache, wherein the cache maintenance operation comprises action taken by the slave device with respect to storage of the data item in the data storage device,
   wherein, when the cache maintenance operation is predetermined as a long-latency operation the master device is capable of issuing to the intermediate device a separated cache maintenance request specifying the data item and the slave device;
   the intermediate device is responsive to the separated cache maintenance request to signal an acknowledgment response to the master device indicative that the intermediate device has taken on responsibility for completion of the cache maintenance operation with respect to the data item and to issue the separated cache maintenance request to the slave device,
   wherein the acknowledgement response is signalled before completion of the cache maintenance operation; and
   the slave device is responsive to receipt of the separated cache maintenance request to signal the acknowledgement response to the intermediate device and is responsive to the completion of the cache maintenance operation with respect to the data item stored in the data storage device to signal a completion response to the master device.

2. The interconnect system of claim 1, wherein the data storage device for long-term storage of the data items comprises non-volatile storage and the cache maintenance operation is a persistent cache maintenance operation to cause the data item to be written to the non-volatile storage and the persistent cache maintenance operation is predetermined as a long-latency operation.

3. The interconnect system of claim 1, wherein the master device comprises a request buffer to store request details of issued requests, wherein the master device is responsive to receipt of the acknowledgment response from the intermediate device to cease storage of request details of the separated cache maintenance request.

4. The interconnect system of claim 3, wherein the master device comprises a request counter, wherein the request counter is responsive to issuance to the intermediate device of the separated cache maintenance request to increment and wherein the request counter is responsive to receipt of the completion response from the slave device to decrement.

5. The interconnect system of claim 1, wherein the master device is capable of issuing the separated cache maintenance request comprising a group identifier, the intermediate device is capable of signalling the acknowledgment response to the master device further comprising the group identifier, and the slave device is capable of signalling the acknowledgment response comprising the group identifier and of signalling the completion response comprising the group identifier.

6. The interconnect system of claim 5, wherein the master device is capable of specifying the group identifier from a set of group identifiers and the master device comprises a set of request counters corresponding to the set of group identifiers, wherein each request counter of the set of request counters is responsive to issuance to the intermediate device of the separated cache maintenance request specifying a corresponding group identifier from the set of group identifiers to increment and wherein the each request counter of the set of request counters is responsive to receipt of the completion response from the slave device specifying the corresponding group identifier to decrement.

7. The interconnect system of claim 5, wherein the master device is capable of associating the group identifier with a staged data processing operation comprising at least one first stage operation and at least one second stage operation, and wherein the master device is capable of issuing the separated cache maintenance request comprising the group identifier in association with the at least one first stage operation, and the master device is capable of withholding initiation of the at least one second stage operation until receipt of the completion response comprising the group identifier from the slave device.

8. The interconnect system of claim 7, wherein the master device comprises a request counter having an initial value, wherein the request counter is responsive to issuance to the intermediate device of the separated cache maintenance request comprising the group identifier to increment and wherein the request counter is responsive to receipt of the completion response comprising the group identifier from the slave device to decrement, and the master device is capable of withholding initiation of the at least one second stage operation until the request counter returns to the initial value.

9. The interconnect system of claim 7, wherein the staged data processing operation comprises at least one of:
a privilege level transition;
a translation table update;
execution of a barrier instruction; and
execution of a specified set of instructions.

10. The interconnect system of claim 9, wherein the master device is arranged to execute sets of instructions corresponding to distinct physical or virtual threads and the specified set of instructions is associated with a specified thread.

11. The interconnect system of claim 1, wherein the slave device is responsive to completion of the cache maintenance operation with respect to the data item stored in the data storage device to signal the completion response to the master device via the intermediate device.

12. The interconnect system of claim 1, wherein the intermediate device is capable of performing cache coherency operations with respect to the data items, and wherein the intermediate device is responsive to the separated cache maintenance request to perform a cache coherency operation with respect to the data item specified in the separated cache maintenance request before signalling the acknowledgment response to the master device and before issuing the separated cache maintenance request to the slave device.

13. The interconnect system of claim 5, wherein the master device is capable of issuing the separated cache maintenance request comprising an identifier for the data item, an identifier for the slave device, an identifier for the master device and the group identifier,
wherein the slave device is responsive to receipt of the separated cache maintenance request to initiate the cache maintenance operation with respect to the data item stored in the data storage device, to store the identifier for the master device and the group identifier, and to discard the identifier for the data item and the identifier for the slave device,
and the completion response generated by the slave device comprises the identifier for the master device and the group identifier.

14. The interconnect system of claim 1, wherein the cache is a local cache associated with the master device.

15. The interconnect system of claim 1, wherein the cache is associated with at least one of the intermediate device and the interconnect circuitry.

16. The interconnect system of claim 1, wherein the slave device is responsive to receipt of the separated cache maintenance request to evaluate a response condition in dependence on the cache maintenance operation and the slave device is responsive to evaluation of the response condition as true to combine the acknowledgement response and the completion response as a combined response signalled to the intermediate device.

17. The interconnect system of claim 16, wherein the slave device is arranged to evaluate the response condition to be true when an estimated completion latency of the cache maintenance operation is below a latency threshold.

18. The interconnect system of claim 1, further comprising volatile storage associated with the slave device and the persistent cache maintenance operation is arranged to cause the data item to copied from the volatile storage to the non-volatile storage.

19. A method of operating an interconnect system comprising a master device, a cache for temporary storage of data items for low-latency access by the master device, an intermediate device, a slave device, wherein the slave device has an associated data storage device for long-term storage of the data items, and interconnect circuitry connecting the master device, the intermediate device, and the slave device, the method comprising:
initiating from the master device a cache maintenance operation in the interconnect system with respect to a data item temporarily stored in the cache, wherein the cache maintenance operation comprises action taken by the slave device with respect to storage of the data item in the data storage device, wherein, when the cache maintenance operation is predetermined as a long-latency operation, the initiating comprises issuing from the master device to the intermediate device a separated cache maintenance request specifying the data item and the slave device, and the method further comprises the steps of:

signalling an acknowledgment response to the master device from the intermediate device in response to the separated cache maintenance request indicative that the intermediate device has taken on responsibility for completion of the cache maintenance operation with respect to the data item, wherein the acknowledgement response is signalled before completion of the cache maintenance operation;

issuing the separated cache maintenance request to the slave device;

signalling the acknowledgement response to the intermediate device from the slave device in response to receipt of the separated cache maintenance request; and signalling a completion response to the master device from the slave device in response to the completion of the cache maintenance operation with respect to the data item stored in the data storage device.

20. An interconnect system comprising:

master device means;

caching means for temporary storage of data items for low-latency access by the master device means;

intermediate device means;

slave device means, wherein the slave device means has associated data storage means for long-term storage of the data items;

interconnect means for connecting the master device means, the intermediate device means, and the slave device means;

means for initiating from the master device means a cache maintenance operation in the interconnect system with respect to a data item temporarily stored in the caching means, wherein the cache maintenance operation comprises action taken by the slave device means with respect to storage of the data item in the data storage means, wherein, when the cache maintenance operation is predetermined as a long-latency operation, the means for initiating comprises means for issuing from the master device to the intermediate device means a separated cache maintenance request specifying the data item and the slave device means, and the interconnect system further comprises:

means for signalling an acknowledgment response to the master device means from the intermediate device means in response to the separated cache maintenance request indicative that the intermediate device means has taken on responsibility for completion of the cache maintenance operation with respect to the data item, wherein the acknowledgement response is signalled before completion of the cache maintenance operations;

means for issuing the separated cache maintenance request to the slave device means;

means for signalling the acknowledgement response to the intermediate device means from the slave device means in response to receipt of the separated cache maintenance request; and means for signalling a completion response to the master device means from the slave device means in response to the completion of the cache maintenance operation with respect to the data item stored in the data storage means.

* * * * *